Nov. 2, 1965  R. O. ISENBARGER ETAL  3,214,829
SEAL INSTALLATION TOOL WITH ALIGNING MEANS
Filed May 24, 1962  2 Sheets-Sheet 1

INVENTORS
ROBERT O. ISENBARGER
WALTER I. BUCHANAN

By Cromwell, Greist & Warden
Attys.

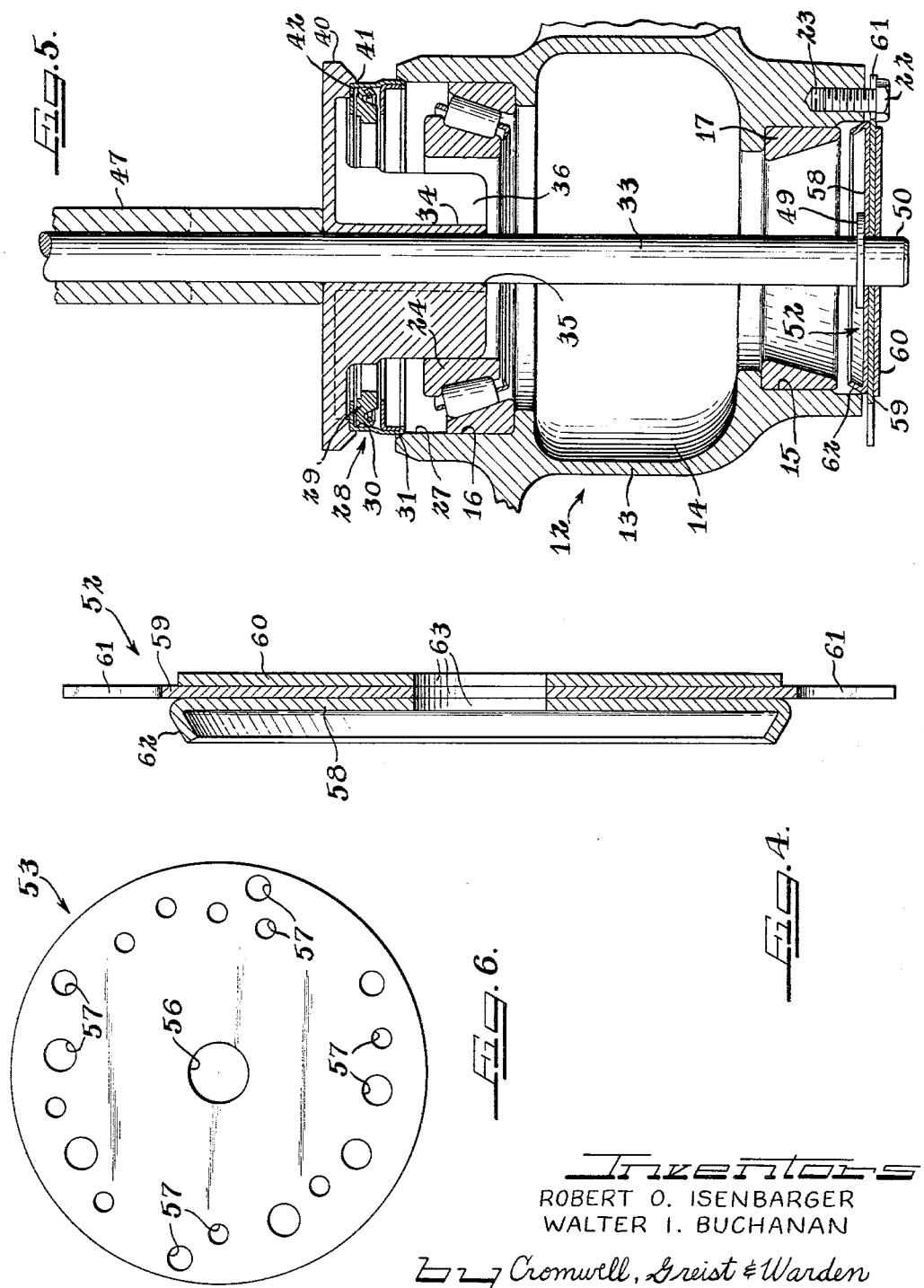

United States Patent Office 3,214,829
Patented Nov. 2, 1965

3,214,829
SEAL INSTALLATION TOOL WITH ALIGNING MEANS
Robert O. Isenbarger and Walter I. Buchanan, Chicago, Ill., assignors to Chicago Rawhide Manufacturing Co., Chicago, Ill., a corporation of Illinois
Filed May 24, 1962, Ser. No. 197,373
6 Claims. (Cl. 29—254)

The present invention relates to a new and improved seal installation tool particularly adapted for use in installing an annular axle seal in a wheel housing.

Axle or spindle seals installed in wheels of the type used on large trailers and semi-trailers must be capable of efficient long-life operation under adverse conditions. Care must be taken in installing a wheel seal as the same is often the only means by which loss of oil and leakage on trailer brake drums is prevented. The need for seal replacement often occurs where the best seal installation facilities are not available. Furthermore, the mechanics making such installations are more often not adequately skilled and a defective installation including damage to the seal may result. Added to these problems is that of the seal installation being partially blind as the hub of the wheel in which the seal is received is depressed inwardly of the brake drum and below the plane of the edge of the tires which are on the wheel at the time of seal installation.

It is an object of the present invention to provide a new and improved, uncomplicated and efficient seal installation tool which is particularly adapted for use in installing a seal in the wheels of large trailers and semi-trailers.

Another object is to provide a seal installation tool which produces a quicker, easier and more accurate seal installation than known types of tools while greatly reducing the danger of damage to the seal undergoing installation.

Still another object is to provide a seal installation tool which may be used by unskilled mechanics with maximum efficiency, which is completely portable and of a type suited for inclusion in a portable kit forming a part of trailer equipment, the tool being of a nature to be adapted for use in a manner to compensate for blind seal installation while including features eliminating or at least substantially minimizing the possibility of seal damage during installation.

Other objects not specifically set forth will become apparent from the following detailed description of the present invention made in conjunction with the accompanying drawings wherein:

FIG. 4 is a transverse section of another form of locator plate member adapted as a part of the tool;

FIG. 5 is a fragmentary section of the tool and hub portion of a wheel illustrating operative use of the tool during installation of a seal; and FIG. 6 is a face view of still another form of locator plate member adapted for use with the tool of the invention.

Figure 1:
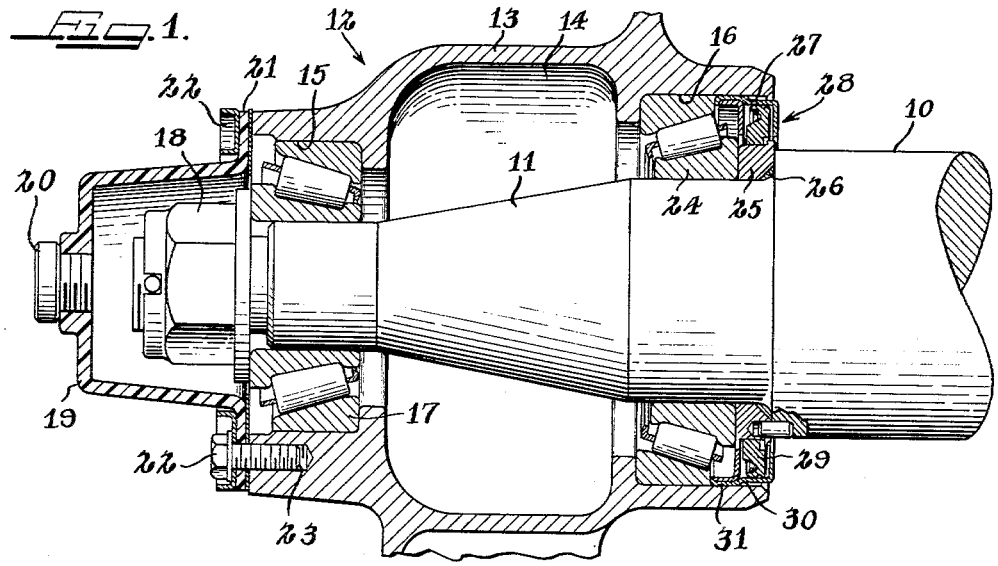
FIG. 1 is a fragmentary section of a known type of trailer wheel assembly illustrating seal operative positioning therein.

A typical trailer wheel assembly is illustrated in FIG. 1. As is well known, such an assembly includes a fixed axle 10 having a spindle 11 forming a part thereof and about which a wheel 12 is received. The wheel 12 includes a hub 13 which internally thereof defines a lubricant housing 14 arranged between a pair of axially aligned, spaced bores 15 and 16. The bore 15 has mounted therein the roller bearing assembly which includes an outer race 17. This bearing assembly is engaged with the outer end of the spindle 11 with the wheel 12 being suitably locked on the axle 10 by a nut 18. A hub cap 19 encloses the outer end of the bore 15 of the hub 13 and carries a removable filler plug 20 which upon removal permits lubricant filling of the housing 14. Lubricant in the housing 14 is maintained at a prescribed level which is readily observable through the hub cap 19 as this cap is made of transparent plastic material. The hub cap 19 is formed with a peripheral attachment flange 21 receiving therethrough a plurality of fasteners in the form of bolts 22 which are threadedly received in recesses 23 formed in the outer radial face of the wheel 12 surrounding the bore 15.

The bore 16 has mounted therein a roller bearing assembly which includes an inner race 24 engaged with the spindle 11. A spindle collar 25 is positioned between the inner race 24 and an enlarged shoulder portion of the axle 10 with an O-ring 26 being suitably retained therebetween. The bore 16 outwardly of the roller bearing assembly is provided with an annular seal mounting area 27 in which a seal assembly 28 is received. The seal assembly 28 may be of any suitable type with the particular assembly illustrated including a rubber or rubber-like sealing member 29 received in a metallic retainer 30 which is provided with an axially projecting press fit portion 31 in engagement with the seal mounting surface 27 of the bore 16. The outer end of the press fit portion 31 is in abutment with a portion of the bearing assembly mounted in the bore 16. The seal 28 illustrated is an external lip-type seal having a flexible spring held lip portion maintained in running engament with an adjacent inner surface of the retainer 30. The sealing member 29 is mounted in fixed sealing engagement with the collar 25 and the retainer 30 rotates with the wheel 12.

Figure 2:
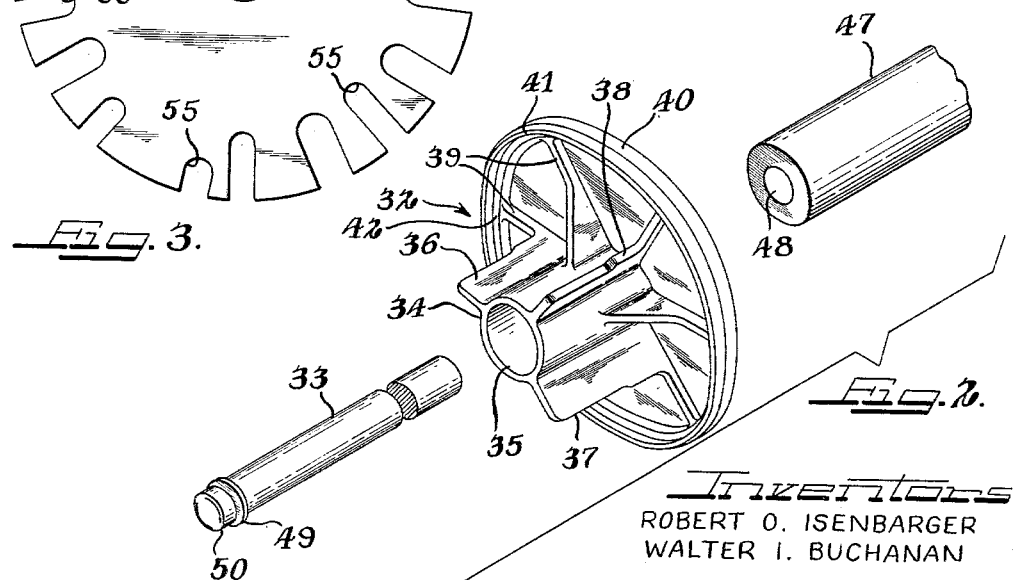
FIG. 2 is a fragmentary perspective in exploded form of the seal installation tool of the present invention.

FIG. 2 illustrates the seal installation tool of the present invention with the exception of a locator plate of a type to be described. The tool includes a seal driving and locating member referred to as a seal adapter 32 which is slidably and concentrically mounted on a rod 33 which is of sufficient length to extend forwardly and rearwardly of the seal adapter 32 as best shown in FIG. 5. The seal adapter 32 is formed with a central cylindrical portion 34 provided with a central bore 35 through which the rod 33 is slidingly received. The cylindrical portion 34 is formed with a plurality of circumferentially spaced, radially outwardly directed and axially extending centering ribs 36 each including a recessed outer top edge portion 37 and a raised or step-like inner top edge portion 38. Integral spoke-like members 39 extend outwardly into integral connection with a co-axial annular seal positioning member 40 having along the forward face thereof in a direction overlying the raised top edge portions 38 of the ribs 36, an outer projecting axial flange portion or rim 41 and an inner recessed radial surface 42.

FIG. 5 illustrates operative use of the seal adapter 32. The projecting rim 41 is dimensioned to mount a seal 28 with a retainer 30 thereof in slight press fit engagement. The radial surface 42 backs up the retainer 30 of a seal assembly to deliver installational force thereto in a manner to be described. This arrangement provides for transmission of seal installation forces to the seal assembly adjacent the outer periphery thereof thus providing for force delivery directly along the strongest portion of the retainer 30 of the seal assembly including the press fit rim 31. In this manner there is no possibility of seal damage or distortion during installation of the seal assembly and a good press fit is obtained with a minimum of force application.

During use of the seal adapter 32, the seal assembly 28 and adapter are aligned with the bore 16 as shown in FIG. 5, the centering ribs 36 being received in the bearing assembly 24 and cooperating with the rim 41 for proper alignment of the seal assembly. The recessed top edge portions 37 of the centering ribs 36 are dimensioned to be received in the bore of the bearing assembly and the raised top edge portions 38 are dimensioned either for engagement with the seal assembly or clearance with the inner diameter thereof to accommodate different types of assemblies having the same outer diameters but variable inner diameters.

Seal installation force is delivered to the seal adapter 32 by a striker member 47 which is in the form of an elongated sleeve of relatively heavy metallic material and which is provided with a central aperture 48 extending longitudinally thereof through which the rod 33 is received. Adequate clearance exists between the inner diameter of the striker member 47 and the rod 33 to permit free falling or sliding of the striker member 47 along the rod 33 into end abutment with the adapter 32. The forward end of the rod 33 has mounted thereon a transversely or outwardly projecting stop means for engagement with a locator plate of a type to be described. The stop means may be of any suitable type such as a split snap ring 49 received in an annular groove formed in the rod 33 just inwardly of the forward end thereof. Other stop means may be used, such as a cotter pin extending through a transverse hole in the rod 33. The forward end of the rod is preferably formed with a beveled or tapered end surface portion 50 to facilitate cooperative association thereof with a locator plate.

Figure 3:
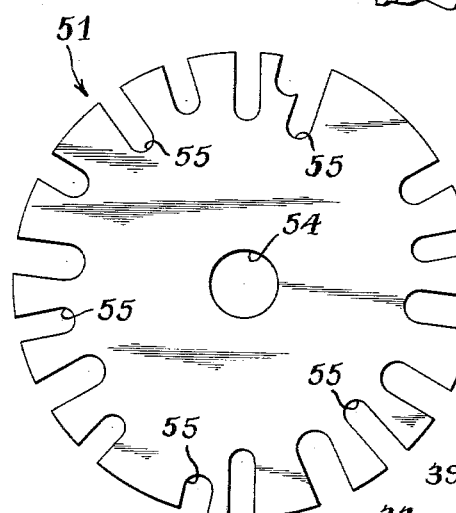
FIG. 3 is a face view of one form of locator plate member forming a part of the tool.

FIGS. 3, 4 and 6 illustrate different embodiments of seal locator members in the form of plates 51, 52 and 53 respectively. Each plate is adapted to be attached to the outer end of a hub portion of the wheel 12 in association with and overlying the bore 15. FIG. 5 illustrates the operative attachment of the locator plate 52 across the outer end of the bore 15, the bolts 22 normally used in attaching the hub cap 19 to the wheel 12 functioning to attach the locator plate 52 to the wheel 12.

Referring to FIG. 3, the locator plate 51 is in the form of a flat disc provided with a central aperture 54 through which the tapered end of the rod 33 is adapted to be received. Preferably, the diameter of the aperture 54 will be just slightly greater than the diameter of the rod 33 to provide for a relatively snug fit. The snap ring 49 projects sufficiently outwardly of the rod 33 to substantially overlie the portion of the plate 51 immediately surrounding the central aperture 54. In this manner the snap ring 49 functions to limit the extent to which the rod 33 is inserted in the aperture 54 during installational use of the tool. The plate 51 along the outer periphery thereof is provided with a plurality of circumferentially spaced, radially outwardly opening notches or recesses 55 some of which vary in depth. The radial spacing and depth of the recesses 55 may vary considerably in the plate 51 to provide for universal use of the plate 51 with wheels of varying sizes. The particular design and arrangement of recsses 55 in the plate 51 illustrated provides for universal use of the plate 51 with many known types of trailer wheels which will vary in bore diameters as well as hub cap fastener location. By way of example, the notches or recesses 55 are so arranged and designed to accomodate bolt location on three to six bolt hole hubs. The recesses are deep enough to accomodate various sizes of bolts and various bolt centers in use.

The locator plate 53 is somewhat similar in construction as the plate 51 described above. This plate includes a center aperture 56 in which the rod 33 is adapted to be received. Adjacent the outer periphery of the plate 53 are a plurality of circumferentially spaced bolt apertures 57 which are arranged to accommodate bolt hole locations on various makes of wheels. The particular plate of FIG. 6 is more positive in use in that proper centering of the central aperture 56 in association with the bore 15 of a wheel 12 is automatically provided by selection of the appropriate bolt holes 57. However, the use of the radially opening slots or recesses 55 of the plate 51 permits greater latitude of use of the plate 51 with any make of wheel and with any type of hub cap fastener.

The locator plate 52 of FIG. 4 constitutes the preferred form of plate used with the seal installation tool of the present invention. This plate is formed from three attached plates 58, 59 and 60. The intermediate plate 59 is of adequate outer diameter to be received over the radial end face of the bore 15 of the wheel 12 as shown in FIG. 5. This plate along the outer periphery thereof may be provided with a plurality of circumferentially spaced, radially opening recesses or slots 61 similar to the recesses 55 forming a part of the locator plate 51. These recesses perform the same function as the recesses 55 previously described. Alternatively, the outer peripheral portion of the intermediate plate 59 may be formed with the circumferentially confined bolt holes 57 of the type forming a part of the plate 53. The plate 60 is of fixed outer diameter selected to conform to the inner diameter of the bore 15 of the most commonly used make of wheel 12. In the instance where a mechanic maintains a given make and size of trailer wheel, an adaptor plate including the fixed plate 60 may be consistently used, the outer diameter of the plate 60 being just slightly less than the diameter of the bore 15 of the wheel 12 to be rather snugly received therein thus providing for consistent automatic centering of the locator plate 52 across the radial face of the bore 15. In such instances the locator plate 52 need not be provided with the plate 58 as a part thereof.

The plate 58 is formed along the outer periphery thereof with a reversely folded edge flange 62 the outer surface of which defines a radially inwardly extending taper. The flange may be circumferentially continuous or may be circumferentially interrupted to accommodate the most efficient mode of fabrication. The three plates 58, 59 and 60 are fixedly interconnected, such as by spot welding, and each plate included a central aperture portion 63 in which the end of the rod 33 is adapted to be received for the purpose previously described.

FIG. 5 illustrates the use of the installation tool of the present invention including the locator plate 52. In the position illustrated, the wheel 12 is laid on its side with the bore 15 opening downwardly. The locator plate 52 is attached across the outer open end of the bore 15 with the inclined flange portion of the plate 58 thereof being received at least partially within the outer end of the bore 15. The hub cap bolts 22 are used in attaching the locator plate 52 to the wheel 12 in the manner previously described and the tapering design of the flange 62 provides for self-centering of the plate 52 relative to the bore 15. The tool is assembled with the seal adapter 32 slidably received on the rod 33, a seal assembly 28 being mounted within the rim 41. The rod 33 is inserted into the wheel through the inner race 24 of the bearing assembly in the bore 16 and is moved downwardly to an extent that the outermost end thereof is received through the central aperture of the locator plate 52. The snap ring 49 abuts the outer surface of the plate 58 and provides a stop means limiting the extent to which the rod is inserted through the central aperture in the locator plate 52. The seal adapter 32 is then moved downwardly along the rod 33 and the centering ribs 36 are received within the inner race 24 within the bore 16. This provides for alignment of the seal assembly 28 with the seal mounting area 27 of the bore 16. The striker member 47 is then raised along the rod 33, such as to the position illustrated in broken lines in FIG. 5, and then permitted to drop into engagement with the rear face of the seal adapter 32. The striker member 47 is of sufficient weight to provide adequate seal driving force to an extent that the seal assembly 28 is eventually driven under controlled conditions into the bore 16 and into the position illustrated in FIG. 1.

During seal installation, the seal assembly is maintained properly centered relative to the bore 16 at all times by reason of the controlled centering of the outermost end of the rod 33 by the locator plate 52 and by reason of the receiving of the centering ribs 36 within the inner race 24 of the bearing assembly in the bore 16. Any type of locator plate used will be of sufficient thickness and strength to avoid bending under seal driving force although it will be appreciated that the seal driving force itself is not directly transmitted to the locator plate. The seal installation tool of the present invention including a suitable type of locator plate used therewith in the manner described above provides for positive alignment of the seal assembly with the bore of the member in which it is to be mounted and completely eliminates the possibility of damaging the inner race 24 during seal installation. In this regard it will be appreciated that the centering ribs 36 forming a part of the seal carrying means 32 are properly aligned with the inner race 24 by use of the locator plate. Furthermore, the outer race 17 mounted in the bore 15 is not contacted in any respect by the seal installation tool during use thereof.

Obviously certain modifications and variations of the invention as hereinbefore set forth may be made without departing from the spirit and scope thereof, and therefore only such limitations should be imposed as are indicated in the appended claims.

We claim:

1. A seal installation tool for use in installing an annular axle seal in a wheel housing wherein a pair of spaced bores define therebetween a lubricant chamber and axle bearing means are mounted in said bores with a first bore providing a seal mounting area outwardly of the bearing means therein, said tool comprising a seal locating means provided with an annular surface adapted to engage a seal for installation in the first bore of a wheel housing, rod means extending forwardly of said seal locating means, and tool locator plate means adapted for mounting in fixed relation across the outer end portion of the other of the spaced bores of a wheel housing, said plate means being formed with rod means receiving means with which said rod means is detachably engaged to provide axial alignment of said seal locating means and a seal engaged thereby with the first bore of a wheel housing and the seal mounting area thereof, said tool plate means being formed with a central aperture in which said rod means is received, said rod means being provided with transversely projecting stop means for engagement with said plate means about said aperture to limit the extent to which said rod means is received in said aperture.

2. A seal installation tool for use in installing an annular axle seal in a wheel housing wherein a pair of spaced bores define therebetween a lubricant chamber and axle bearing means are mounted in said bores with a first bore providing a seal mounting area outwardly of the bearing means therein, said tool comprising a seal locating means provided with an annular surface adapted to engage a seal for installation in the first bore of a wheel housing, rod means extending forwardly of said seal locating means, and tool locator plate means adapted for mounting in fixed relation across the outer end portion of the other of the spaced bores of a wheel housing, said plate means being formed with rod means receiving means with which said rod means is detachably engaged to provide axial alignment of said seal locating means and a seal engaged thereby with the first bore of a wheel housing and the seal mounting area thereof, said seal locating means including circumferentially spaced centering ribs for alignment in the axle bearing means of the first bore of a wheel housing, and an annular seal engaging means located radially outwardly of said centering ribs, said centering ribs being dimensioned to accommodate seals of different inner diameters.

3. A seal installation tool for use in installing an annular axle seal in a wheel housing wherein a pair of spaced bores define therebetween a lubricant chamber and axle bearing means are mounted in said bores with a first bore providing a seal mounting area outwardly of the bearing means therein, said tool comprising a seal locating means provided with an annular surface adapted to engage a seal for installation in the first bore of a wheel housing, rod means extending forwardly and rearwardly of said seal locating means, tool locator plate means adapted for mounting in outer surface covering relation with the other of the spaced bores of a wheel housing, said plate means being formed with rod means receiving means with which said rod means is detachably engaged to provide axial alignment of said seal locating means and a seal engaged thereby with the first bore of a wheel housing and the seal mounting area thereof, said seal locating means being movable on said rod means to provide for seal installation in the seal mounting area of a wheel housing, and striker means carried by the rearward extension of said rod means and axially movable relative thereto and to said seal locating means, said striker means being arranged for abutment with a surface forming a part of said tool and which is fixed relative to said seal locating means to transmit seal installation forces generated by said striker means through said seal locating means to the seal engaged thereby, said tool plate means being formed with a central aperture in which said rod means is received, said rod means being provided with transversely projecting stop means for engagement with said plate means about said aperture to limit the extent to which said rod means is received in said aperture.

4. A seal installation tool for use in installing an annular axle seal in a wheel housing wherein a pair of spaced bores define therebetween a lubricant chamber and axle bearing means are mounted in said bores with a first bore providing a seal mounting area outwardly of the bearing means therein, said tool comprising a seal locating means provided with an annular surface adapted to engage a seal for installation in the first bore of a wheel housing, rod means extending forwardly and rearwardly of said seal locating means, tool locator plate means adapted for mounting in outer surface covering relation with the other of the spaced bores of a wheel housing, said plate means being formed with rod means receiving means with which said rod means is detachably engaged to provide axial alignment of said seal locating means and a seal engaged thereby with the first bore of a wheel housing and the seal mounting area thereof, said seal locating means being movable on said rod means to provide for seal installation in the seal mounting area of a wheel housing, and striker means carried by the rearward extension of said rod means and axially movable relative thereto and to said seal locating means, said striker means being arranged for abutment with a surface forming a part of said tool and which is fixed relative to said seal locating means to transmit seal installation forces generated by said striker means through said seal locating means to the seal engaged thereby, said tool plate means including axially projecting means adapted to be received in the other bore of a wheel housing to center said plate means.

5. A seal installation tool for use in installing an annular axle seal in a wheel housing wherein a pair of spaced bores define therebetween a lubricant chamber and axle bearing means are mounted in said bores with a first bore providing a seal mounting area outwardly of the bearing means therein, said tool comprising a seal locating means provided with an annular surface adapted to engage a seal for installation in the first bore of a wheel housing, rod means extending forwrdly and rearwardly of said seal locating means, tool locator plate means adapted for mounting in outer surface covering relation with the other of the spaced bores of a wheel housing, said plate means being formed with rod means receiving means with which said rod means is detachably engaged to provide axial alignment of said seal locating means and a seal engaged thereby with the first bore of a wheel housing and the seal mounting area thereof, said seal locating means being movable on said rod means to provide for seal installation in the seal mounting area of a wheel housing, and striker means carried by the rearward extension of said rod means and axially movable relative thereto and to said seal locating means, said striker means being arranged for abutment with a surface forming a part of said tool and which is fixed relative to said seal locating means to transmit seal installation forces generated by said striker means through said seal locating means to the seal engaged thereby, said tool plate means including axially projecting means adapted to be received in the other bore of a wheel housing to center said plate means, said projecting means being formed with an axially directed taper to provide for plate centering in bores of varying diameter.

6. A seal installation tool for use in installing an annular axle seal in a wheel housing wherein a pair of spaced bores define therebetween a lubricant chamber and axle bearing means are mounted in said bores with a first bore providing a seal mounting area outwardly of the bearing means therein, said tool comprising a seal locating means provided with an annular surface adapted to engage a seal for installation in the first bore of a wheel housing, rod means extending forwardly and rearwardly of said seal locating means, tool locator plate means adapted for mounting in outer surface covering relation with the other of the spaced bores of a wheel housing, said plate means being formed with rod means receiving means with which said rod means is detachably engaged to provide axial alignment of said seal locating means and a seal engaged thereby with the first bore of a wheel housing and the seal mounting area thereof, said seal locating means being movable on said rod means to provide for seal installation in the seal mounting area of a wheel housing, and striker means carried by the rearward extension of said rod means and axially movable relative thereto and to said seal locating means, said striker means being arranged for abutment with a surface forming a part of said tool and which is fixed relative to said seal locating means to transmit seal installation forces generated by said striker means through said seal locating means to the seal engaged thereby, said seal locating means including circumferentially spaced centering ribs for alignment in axle bearing means of the first bore of a wheel housing, and an annular seal engaging means located radially outwardly of said centering ribs, said centering ribs being dimensioned to accommodate seals of different inner diameters.

References Cited by the Examiner

UNITED STATES PATENTS

| | | | |
|---|---|---|---|
| 1,759,285 | 5/30 | Sease | 29—275 |
| 2,531,799 | 11/50 | Zumwalt | 29—271 X |
| 3,030,702 | 4/62 | Fowler | 29—280 |

WILLIAM FELDMAN, *Primary Examier.*